(12) United States Patent
Chen Kaidi

(10) Patent No.: US 12,058,172 B2
(45) Date of Patent: Aug. 6, 2024

(54) DEFENSE AGAINST EMOJI DOMAIN WEB ADDRESSES

(71) Applicant: PAYPAL, INC., San Jose, CA (US)

(72) Inventor: George Chen Kaidi, Singapore (SG)

(73) Assignee: PAYPAL, INC., San Jose, CA (US)

( * ) Notice: Subject to any disclaimer, the term of this patent is extended or adjusted under 35 U.S.C. 154(b) by 502 days.

(21) Appl. No.: 17/347,449

(22) Filed: Jun. 14, 2021

(65) Prior Publication Data

US 2022/0400134 A1   Dec. 15, 2022

(51) Int. Cl.
| | |
|---|---|
| *H04L 9/40* | (2022.01) |
| *G06F 3/04817* | (2022.01) |
| *G06V 30/148* | (2022.01) |
| *H04L 9/06* | (2006.01) |
| *G06V 30/10* | (2022.01) |

(52) U.S. Cl.
CPC ...... *H04L 63/1483* (2013.01); *G06F 3/04817* (2013.01); *G06V 30/153* (2022.01); *H04L 9/0643* (2013.01); *G06V 30/10* (2022.01)

(58) Field of Classification Search
None
See application file for complete search history.

(56) References Cited

U.S. PATENT DOCUMENTS

| | | | |
|---|---|---|---|
| 2020/0210745 A1* | 7/2020 | Luo | G06V 30/413 |
| 2021/0377300 A1* | 12/2021 | Devane | H04L 63/1416 |
| 2022/0210146 A1* | 6/2022 | Dhanabalan | H04L 63/1483 |

* cited by examiner

*Primary Examiner* — Syed A Roni
(74) *Attorney, Agent, or Firm* — Haynes and Boone, LLP

(57) ABSTRACT

Systems and methods for defending against emoji domain web address phishing are disclosed. A system may provide computer system security in various instances in which a web address includes an emoji character, which can be rendered as a graphical icon on a user system, and which may cause user confusion leading to a possible computer security breach. The system receives a web address as an input to a web browser. The system processes the received web address to remove any emoji characters present in the received web address. The system compares the processed web address to the received web address and determines whether the processed web address matches the received web address. Various actions are performed to prevent successful phishing attempts against users based on whether the processed web address matches the received web address.

20 Claims, 8 Drawing Sheets

DEFENSE AGAINST EMOJI DOMAIN WEB ADDRESSES

TECHNICAL FIELD

The present disclosure generally relates to electronic device security and more particularly to minimizing successes of computer security attacks (e.g. phishing) that use emoji domain web addresses, according to various embodiments.

BACKGROUND

Many instances of computer security breach (e.g. identity theft, account compromise, etc.) are caused by online phishing traps. Phishing attempts can include a malicious party posing to a user as a legitimate service provider with which the user has an account, usually by providing a presentation (e.g., a web page interface, an e-mail, etc.) that matches the look and feel of one generated by the legitimate service provider. The malicious party then requests the user to provide sensitive information (e.g., a user name, a password, etc.) via the presentation. Using the information wrongfully obtained from the user, the malicious party can attempt to take over the user's account and/or computing device. For example, the malicious party could attempt to perform unauthorized transactions. Or as another example, the malicious party could misappropriate computer resources of the user's computing device (run virus software, ransomware, etc.). As the use of emojis and various other nonconventional text symbols have become more prevalent in recent times in forms of communication, phishing attacks by the malicious parties have become increasingly difficult to detect. As such, Applicant recognizes there is a need in the art for improved phishing detection and prevention, including for web domain addresses that allow the use of emoji characters.

Figure 1A:
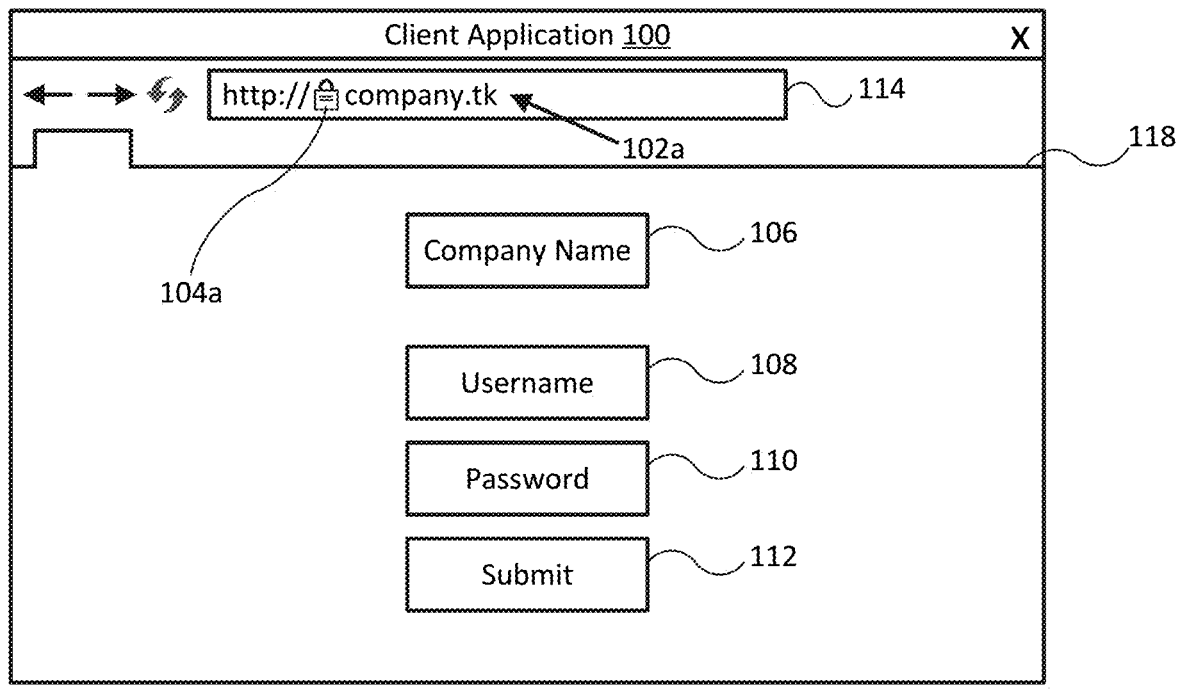
FIGS. 1A-1D illustrate example phishing attempts using emoji-containing domain web addresses in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

The present disclosure describes systems and methods for detecting and preventing computer security breach attempts (including phishing attempts). Phishing includes attempting to steal sensitive information, such as usernames, passwords, contact information, answers to security questions, user identifiers, and financial information, using deceptive e-mails, websites, and/or downloadable applications. New phishing attacks are anticipated to emerge alongside the growing prevalence of emojis and various other nonconventional forms of communication on electronic devices.

In some cases, phishing attacks may involve the deceptive use of emoji characters used in domains or sub-domains (e.g., in web addresses). For example, referring to FIG. 1A, a phishing web address 102a may include an emoji 104a designed to deceive a user. The emoji 104a appears at the front of the "company.tk" domain of the web address 102a and is intended to falsify a level of security associated with the web address 102a. The emoji 104a may be an emoji that looks like a security lock to mislead a user into believing that the emoji 104a is part of a website security certification, offered by client application 100 (e.g., a web browser), certifying that the web address 102a is secure. A user could have the false belief that the web address 102a is secure because many web browsers used today show a "lock" symbol in the web address of the web browser, generally at the left side of the web address bar. A legitimately displayed "lock" symbol (or any other symbol that the web browser uses) is generally used to provide site information to a user regarding the security profile of the current website (e.g., a connection is being made to the web server using secure hyper-text transfer protocol (HTTPS)). However, a legitimate "lock" symbol used for the aforementioned purpose would not be part of the web address of the current website/

In FIG. 1A, the web address 102a may direct the user to a website 118 designed to spoof a legitimate website. For example, the website 118 may include graphical content 106 (e.g., images, text, banners, etc.) designed to imitate a legitimate website and deceive the user into believing that she/he is currently viewing the legitimate website. The malicious actor may have designed the website 118 so that the user would be misled into entering his or her username 108, password 110, or other information into the website 118 and submitting 112 the information to a receiving computer system controlled by the malicious actor. The username 108, password 110, or other information may provide the malicious actor with the credentials needed to perform malicious acts such as accessing the real account of the user on the legitimate website.

Figure 1B:
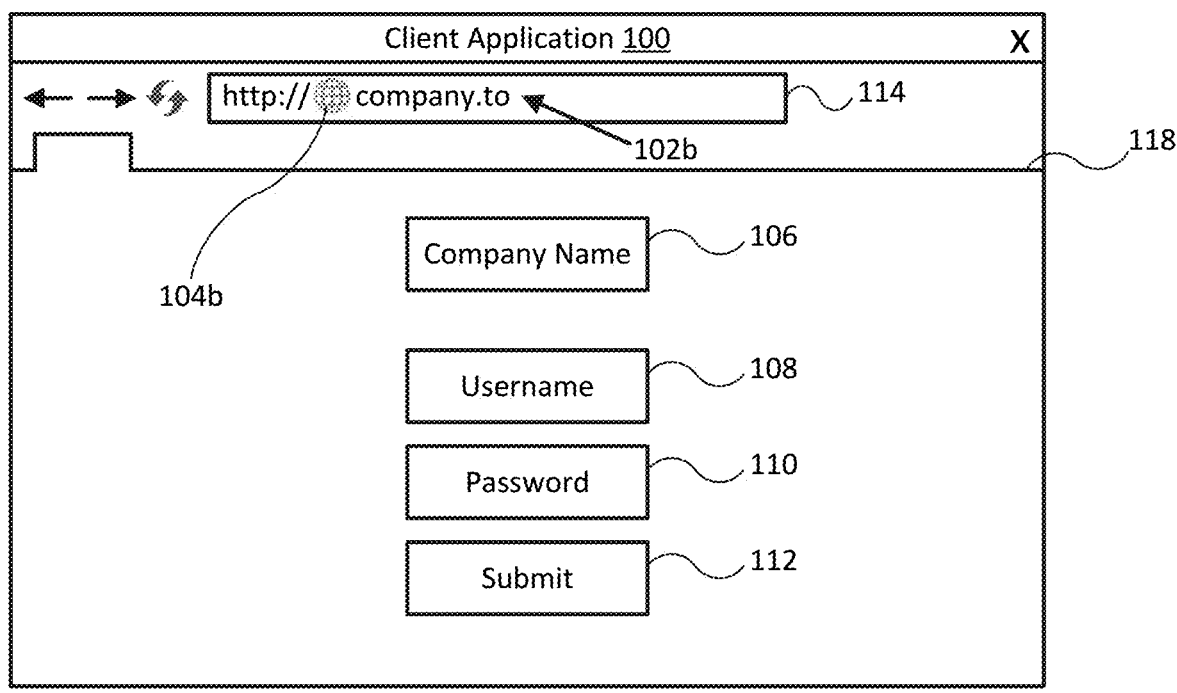
Figure 1C:
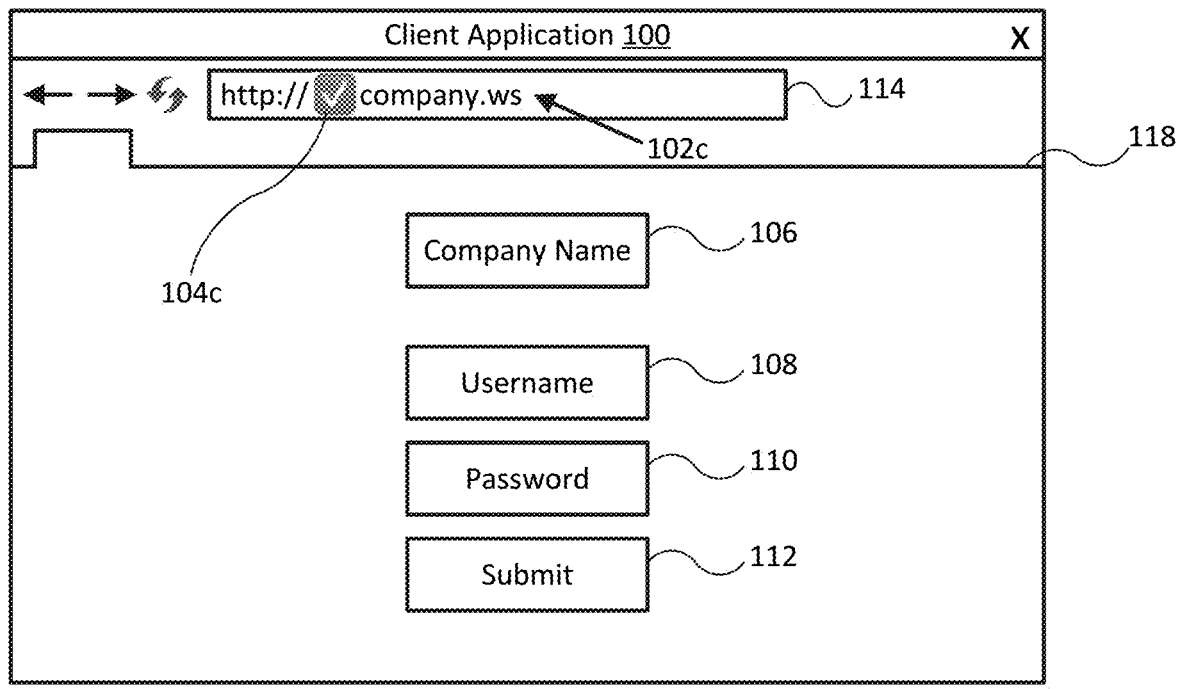
Figure 1D:
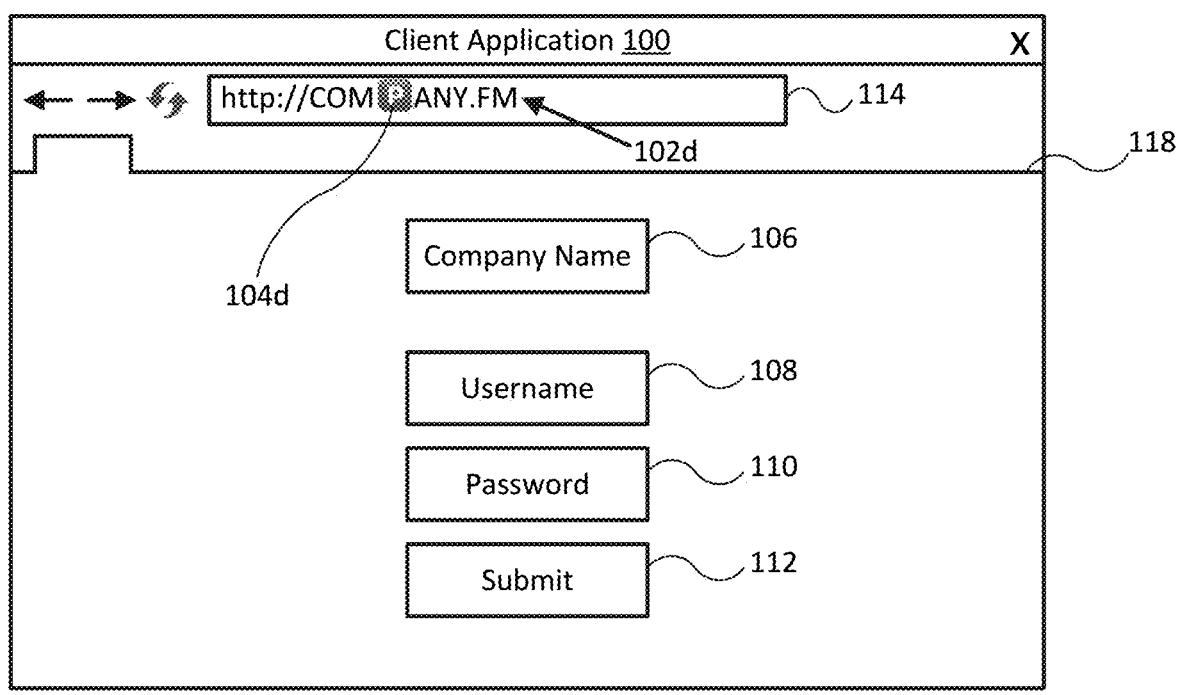

Similar phishing methods are illustrated in FIGS. 1B-1D. For example, FIG. 1B shows a deceptive emoji 104*b* in a web address 102*b* where the emoji 104*b* looks like a world wide web logo. FIG. 1C shows a deceptive emoji 104*c* designed to deceive a user into believing that web address 102*c* is legitimate due to the emoji 104*c* looking like a verified checkmark icon. FIG. 1D shows a "P" emoji 104*d* used instead of an alphanumeric character "P" in the web address 102*d* "COMPANY.FM," which may go unnoticed to an unsuspecting user in a phishing attack. Additional phishing methods involving emails using deceptive emojis in sender email addresses are also contemplated as a problem. While reference is generally made to emojis in the present disclosure, the systems and methods described herein may also be implemented to detect and prevent phishing attempts that use other nonconventional characters.

In one embodiment, a computer system, capable of detecting and preventing a phishing attack, includes a non-transitory memory that stores instructions and one or more hardware processors that can read the instructions to cause the computer system to perform operations. For example, the computer system may receive a web address that has been entered into a web browser or other client application. In one case the web address may include a deceptive character such as an emoji and may correspond to a phishing website. The system may process the web address to remove any emoji character. In one example, the system may process the web address by parsing the web address character-by-character and remove any emoji characters. In another example, the computer system may generate a screen image of the web address and convert the screen image of the web address to a character string of alphanumeric characters identified from the web address (e.g., emojis in the web address may be omitted from the alphanumeric characters identified from the web address). The computer system may hash the character string, using a hash function, to provide a first hash value. Using the same hash function, the computer system may hash the original web address that contains the deceptive character to provide a second hash value. By comparing the first hash value to the second hash value, the system can determine whether the first hash value matches the second hash value. In the case where the deceptive emoji is not in the character string recognized from the screen image, the first hash value will not match the second hash value as the character string used as an input to the hash function will not have the emoji while the original web address used as an input to the hash function to provide the second hash value will have the emoji. Thus, the respective outputs of the hashing function from two different inputs will be different. In a case where the web address does not contain an emoji, the character string input and the original web address input should be the same and their input to the hash function should generate a matching output. When the computer system determines that the first hash value and the second hash value do not match, it is likely that an emoji or other character in the web address is being used to deceive the user and the user may be on a phishing website. In some embodiments, hashing may not be used, such as when the original state web address (e.g., the received web address character string) can be compared to a processed web address (e.g., a character string that has been processed to remove any emoji characters). Further details regarding these and other embodiments of the present disclosure are discussed below.

Figure 2:
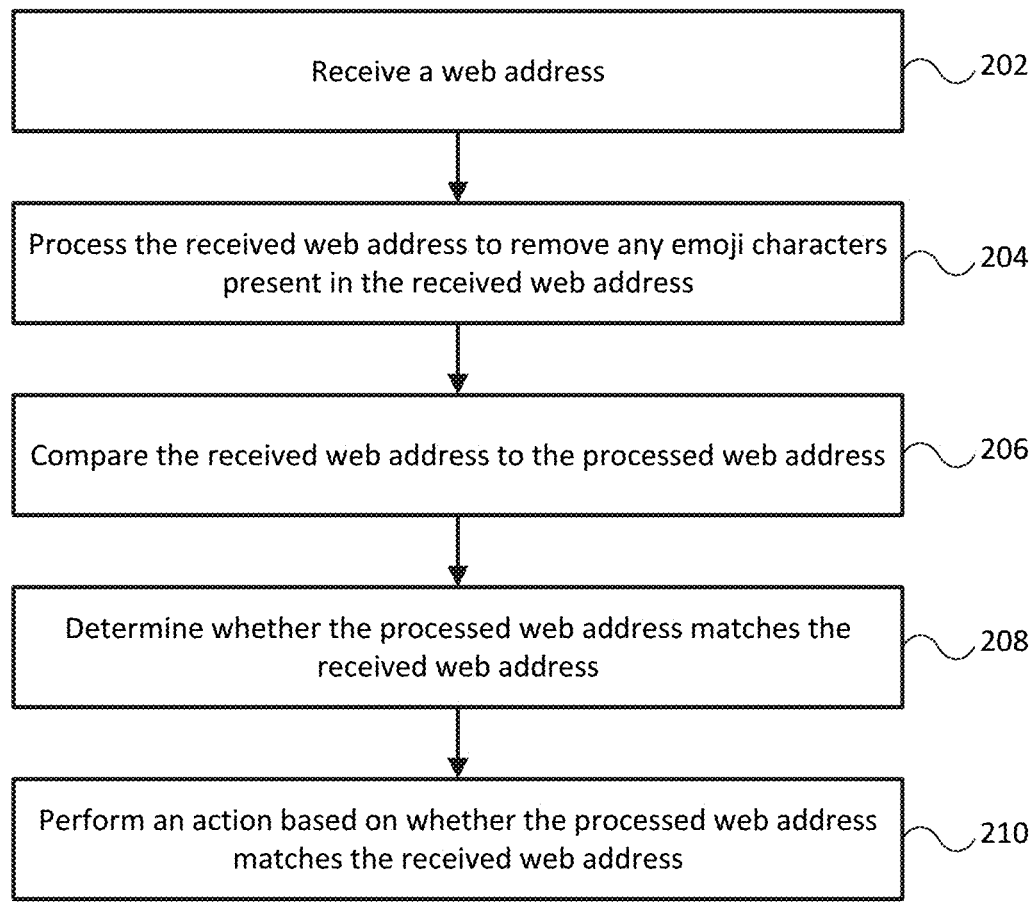
FIG. 2 illustrates a flow diagram of a process for preventing successes in phishing attempts that use emoji containing domain web addresses in accordance with one or more embodiments of the present disclosure.

Referring to FIG. 2, a flow diagram of a process 200 for detecting and preventing emoji-based phishing is illustrated in accordance with one or more embodiments of the present disclosure. The blocks of process 200 are described herein as occurring serially or linearly (e.g., one after another). However, multiple blocks of process 200 may occur in parallel. In addition, the blocks of process 200 need not be performed in the order shown and/or one or more of the blocks of process 200 need not be performed.

In some embodiments, process 200 includes a configuration process that occurs upon installation of an anti-phishing plug-in for a computer application (e.g., an extension, an add-on, an add-in application). In one embodiment, the computer application may be a web browser. As used herein, in reference to one or more embodiments, a "web browser" means any software application suitable for retrieving, presenting, or traversing digital information over a network (e.g., Firefox™, Chrome™, Opera™, Edge™, Internet Explorer™, Safari™ email applications, social media applications, mobile applications, and the like). A web browser accepts as an input a network address and provides a page display of the information available at that network address. Underlying functionality of a web browser includes the ability to execute program code, such as JavaScript or the like, to allow a computing device to interact with a website at a given network address to which the browser has been "pointed."

In the configuration process, the user may have the option to set up and/or register the anti-phishing plug-in's safety features to detect and prevent emoji-based phishing. The plug-in may include a graphical user interface (GUI) for creating, modifying, managing, configuring, and/or verifying parameters and options in configuration files for the plug-in. The plug-in may be part of the computer application and stored in a non-transitory memory as instructions readable by one or more hardware processors of a computing device. The non-transitory memory and one or more hardware processors may be integrated into a system such that the instructions stored on the non-transitory memory may be read by the one or more hardware processors to cause the system to perform one or more operations of process 200 discussed below.

At block 202, the system may receive a web address. In one embodiment, the web address may have been entered as an input to a web browser to direct the web browser to a website corresponding to the web address. For example, the web address may have been entered as an input to the web browser's search function in response to a user clicking on a hyperlink in the web browser or clicking on a hyperlink in a separate computer application (e.g., email client, text message application, social media application, and so forth) which opens the search function of the web browser to search for the website corresponding to the web address of the hyperlink. As a further example, the web address may have been entered as a manual input by the user into an address bar of the web browser or a search function of a web page loaded in the web browser (e.g., entered into a search engine website).

As shown in FIGS. 1A-1D, the web address (e.g., web addresses 102*a-d*) may contain an emoji character (e.g., emojis 104*a-d*). In some cases, the emoji may be displayed by the web browser as a small digital image or icon corresponding to the Unicode code point for the emoji as shown in FIGS. 1A-1D. However, in some cases, the web browser may decode the web address containing the emoji to resolve it to punycode, which is a representation of Unicode with a limited ASCII character subset used for interment hostnames. For example, referring to FIG. 1A, instead of the emoji 104a appearing as a security lock emoji character in web address 102a, web address 102a may be displayed in punycode form "http://xn--company-hj64e.tk/." When a web address is displayed in decoded punycode form, a user may be able to recognize that the web address is unfamiliar and could possibly be a phishing website, however, when the web address is displayed in an encoded form including an emoji (e.g., as shown in FIGS. 1A-1D), there is a risk that the user can be deceived into interacting with an illegitimate phishing website as the emoji can go unnoticed.

In response to receiving the web address, the system may proceed to block 204 in process 200. However, in some embodiments, the system may prevent outgoing network communications to a receiving server corresponding to the website associated with the received web address until the system can determine whether the web address is safe. Similarly, the system may block incoming network communications from the server until the web address is confirmed to be safe or the user confirms that she/he understands the risks of the website and would like to continue regardless of the risks.

At block 204, the system may process the received web address to remove any emoji characters present in the received web address. In one embodiment, the system may process the received web address by parsing a plurality of characters in the web address to generate a processed web address that omits any emoji characters present in the received web address (e.g., the processed web address may be a new separate character string). In some embodiments, the system may process the received web address using an optical character recognition technique.

In another embodiment, the system may process the received web address in the following manner. The system may generate a screen image of the received web address. For example, the system may generate the screen image of the received web address by saving a framebuffer which may constitute a portion of random-access memory containing a bitmap that drives a video display for a computing device (e.g., a mobile device associated with a user). The computing device may have a video card or graphics card that has circuitry configured to convert the bitmap into a video signal that can be displayed on a display of the computing device. In some embodiments, the computing device may have dedicated application programming interface (API) calls to allow for obtaining the data that represents the pixels in a screen frame. Thus, the system may execute an API call to generate the screen image in some embodiments. Note, the system may be part of the computing device.

The system may convert the screen image of the received web address to a character string. In some embodiments, the system may convert the screen image of the received web address to a character string using optical character recognition. The optical character recognition may be character-limited to a set of alphabetical and numerical characters such as A-Z and 0-9, case insensitive, or A-Z, a-z, and 0-9, case sensitive. In some cases, the optical character recognition may be also limited to certain symbols such as punctuation and mathematical symbols. The optical character recognition may be limited to a set of characters that omit emojis, and thus emojis in the received web address may be bypassed when converting the screen image of the received web address to a character string. As such, referring to FIG. 1B, when a screen image 114 of the web address 102a is converted to a character string, the security lock emoji 104a may not be recognized or otherwise may be omitted. Thus, the character string of the web address 102a using optical character recognition may produce an output of "http://company.tk" with the emoji 104a omitted. In some embodiments, the outputted character string at block 204 may be referred to as the processed web address.

In some embodiments, using a hash function, the system may hash the processed web address (e.g., the character string generated at block 204) to provide a first hash value. Various hash functions can be implemented. A hash function should be implemented such that if the input data to the hash function is unknown, reconstructing the input data by knowing the stored hash value output is difficult and mostly impossible.

The system, using the same hash function, may hash the received web address to provide a second hash value. In the following block 206, the first hash value and the second hash value may be used in some embodiments to determine whether the processed web address matches the received web address instead of using the character strings of the processed web address and received web address in their respective non-hashed states.

Referring again to FIG. 2, at block 206, the system may compare the received web address to the processed web address. For example, the system may perform a string comparison operation on the received web address or the processed web address and use the counterpart web address as the argument in the string comparison operation to determine if there are any differences between the received web address character string and the processed web address character string. In a case where the originally received web address did not have emoji(s), the received web address should match the processed web address. By contrast, in a case where the originally received web address had emoji(s), the received web address should not match the processed web address due to the removal of the emoji(s) in processing the received web address at block 204.

In an embodiment where the received web address is processed using screen images and hashing as described at block 204, if the first hash value matches the second hash value, the character string recognized from the screen image of the received web address matches the character string of the received web address in its original state. By contrast, if the first hash value does not match the second hash value, the character string recognized from the screen image of the received web address does not match the character string of the received web address in its original state. As an illustration, referring again to FIG. 1A, the character string recognized from the screen image 114 of the web address 102a may be "http://company.tk," which omits the security lock emoji 104a. However, the original character string for the web address 102a may include the security lock emoji 104a. Thus, the character string that omits the security lock emoji 104a will result in a different hash value than the character string that includes the security lock emoji 104a.

At block 208, the system may determine whether the processed web address matches the received web address based on the comparison performed at block 206. If the received web address matches the processed web address (e.g., their character strings match or their hash values match depending on implementation), it may indicate that the received web address likely does not contain any hidden or deceptive characters, including emojis. On the other hand, if the received web address does not match the processed web address, it may indicate that the received web address contains a hidden or deceptive character such as an emoji character, like security lock emoji 104a of FIG. 1A, which could have been intentionally implemented in the web address 102a to trick a user into believing that the web address 102a is secure/legitimate when the web address 102a in fact corresponds to a phishing website.

Figure 3A:
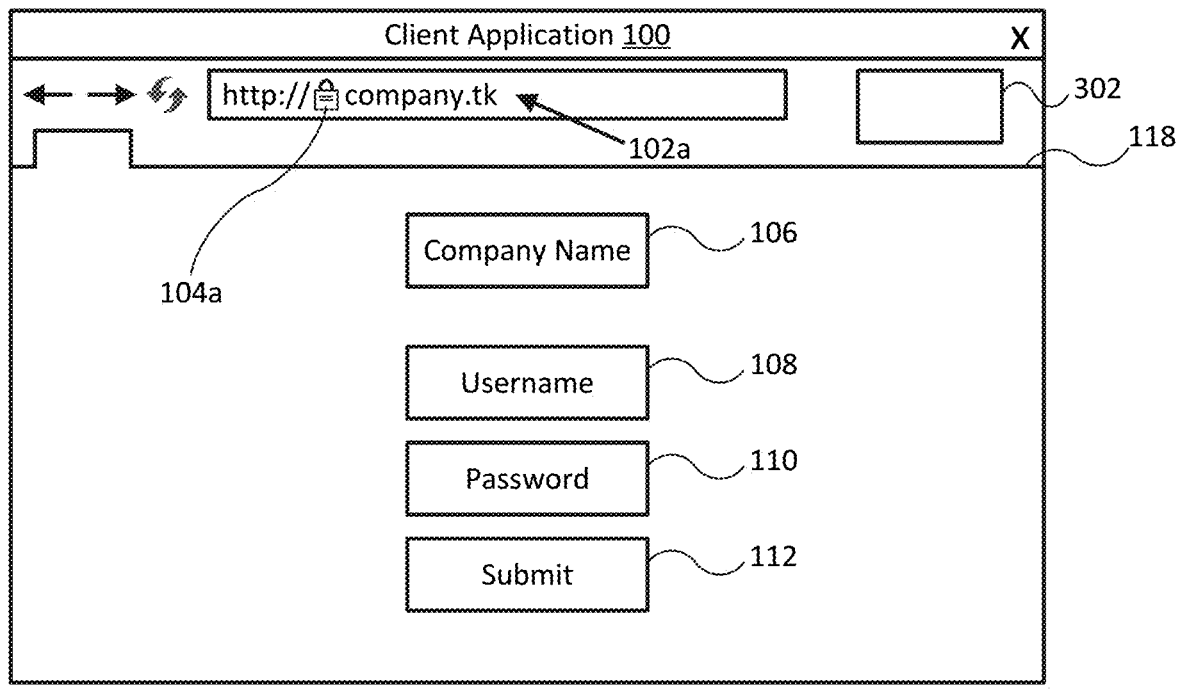
FIGS. 3A-3C illustrate examples for preventing successful phishing attempts in accordance with one or more embodiments of the present disclosure.
Figure 3B:
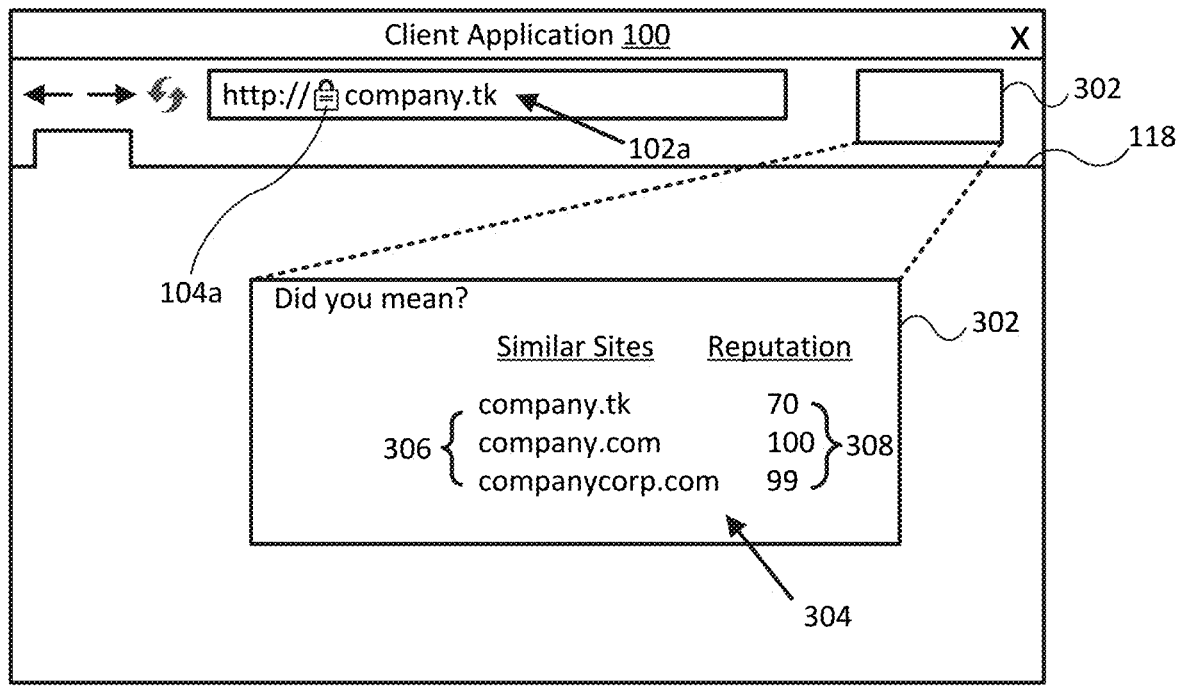

At block 210, the system may perform an action based on whether the processed web address matches the received web address. For example, as shown in FIG. 3A, if the received web address does not match the processed web address, the system may display an indicator 302 in the client application 100 (e.g., the web browser) to alert the user that the received web address has hidden characters and that the received web address may correspond to a potential phishing website. As shown in FIG. 3B, in a further example of a preventive action performed at block 210, the system may display a pop up 304 in the indicator 302 that shows similar websites 306 to the website corresponding to web address 102a. In one embodiment, the similar websites 306 may be websites that do not include the emoji 104a and are known to be safe websites. The website corresponding to the web address 102a may be an attempt to imitate one of the similar websites 306 by including the emoji 104a to trick the user into believing that the website is legitimate. In some embodiments, the similar websites 306 may have a corresponding reputation 308 (e.g., reputation score) displayed next to them. The reputation 308 for the similar websites 306 may be determined based on aggregated data of users interacting with the similar websites 306. For example, the various other users may have plug-ins or configurations in their web browsers that track the websites that they visit and based on the frequency of navigation to the websites and/or user reports regarding the legitimacy of the website, the reputation 308 for the websites may be calculated and tracked.

In some embodiments, the similar websites 306 may show a domain family that the similar websites 306 belong to. For example, domains such as "company.tk", "company.org," (not shown in FIG. 3B) and "company.net" (not shown in FIG. 3B) may belong to the same domain grouping or SSL-certification grouping and the system may simply display the master domain for the family of domains (e.g., company.com).

In some embodiments, if there are similar websites 306 and the current web address 102a corresponds to a website that has a low reputation (e.g., below a certain threshold), the system may display a pronounced warning to the user such as a red flag in the web browser adjacent to the web address bar. The system may provide additional indicators in the web browser to warn the user that the current web address 102a may correspond to an illegitimate or phishing website. For example, to warn the user, the system may change the text color of the web address 102a to a color such as red to indicate the web address 102a has been determined to be a potential phishing website, while a green color can be used to indicate the web address 102a has been determined to be safe. As another example, to warn the user, the system may outline or box the web address 102a with a frame having a certain color such as red, while a color such as green may indicate the web address 102a is safe. As another example, to warn the user, the system may require the display of the web address 102a with http/https in the web address 102a so that it is more obvious to the user that the web address 102a contains the emoji 104a. Since some web browsers hide http/https in the address bar for aesthetic purposes, requiring the display of http/https should allow for a user to see that the emoji 104a is part of the web address 102a instead of a legitimate security icon for the web browser. In yet another example, to warn the user, the system may display, in an alternating fashion, the received web address having an emoji character the received web address having the emoji character replaced by text code (e.g., punycode) that represents the emoji character.

Figure 3C:
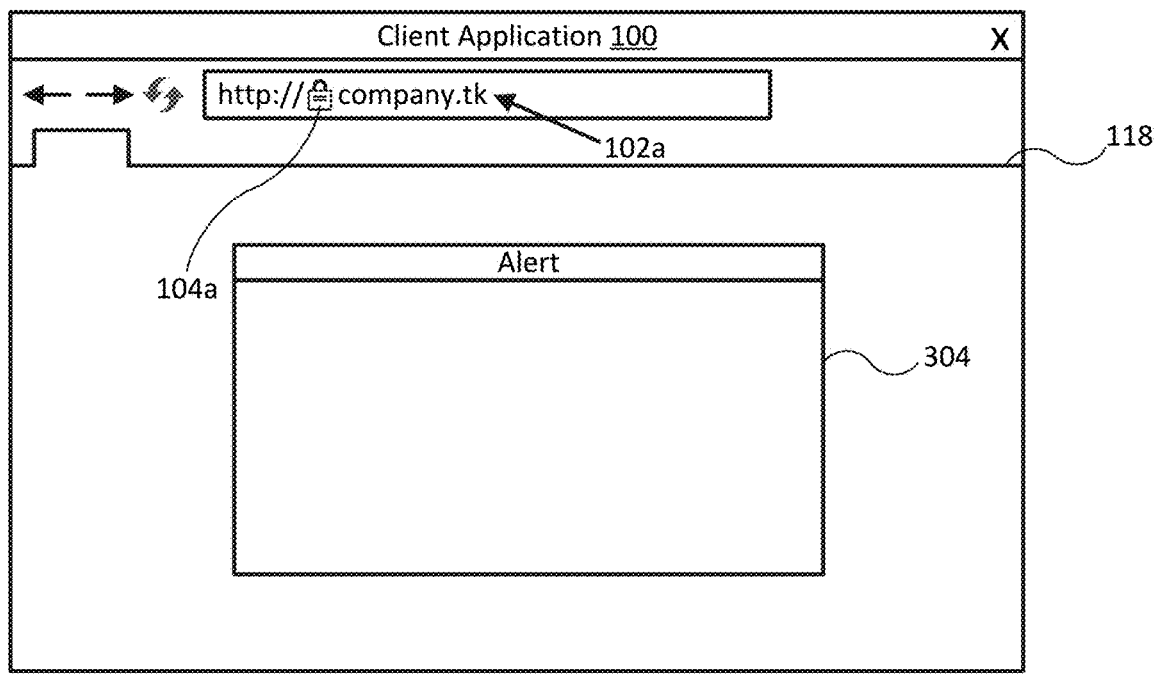

In another embodiment, further actions performed at block 210 may be based on the user's web browsing history. For example, based on assessing the user's web browsing history, the system may detect that the user is navigating to the web address 102a for a first time. If the user is navigating to the web address 102a for the first time, and the web page for the web address 102a is requesting entry of personal information or other sensitive data, the system may cause a prompt to pop up in the web browser for confirmation from the user to continue. For example, if the processed web address does not match the received web address (or the first hash value does not match the second hash value) at block 208, the system may display an alert 304 that contains dialogue explaining to the user that the website may be a phishing website as shown in FIG. 3C. In some embodiments, the system may navigate away from the web address or prevent the web page corresponding to the web address from loading until the user confirms that she/he would like to continue on the web page. In some embodiments, the system may navigate away from the web page or block the user from entering personal information into the web page until the user takes further action in response to the alert 304 confirming that she/he understands the risk associated with the web page.

In yet another embodiment, additional security measures may be taken to determine whether a web address is legitimate. For example, the system may load, in the web browser, a web page corresponding to the received web address. The web page may have one or more loaded images. The system may generate an image-domain signature based on the received web address and the one or more loaded images to the web page. For example, a function may take as input the received web address and image data for the loaded images and generate an output of the image-domain signature. The image-domain signature may be compared against a repository of image-domain signatures in a database that are known to be safe (e.g., whitelisted). The repository of image-domain signatures that are known to be safe may be provided by a service provider and developed based on browsing data aggregated from users associated with the service provider.

Figure 3D:
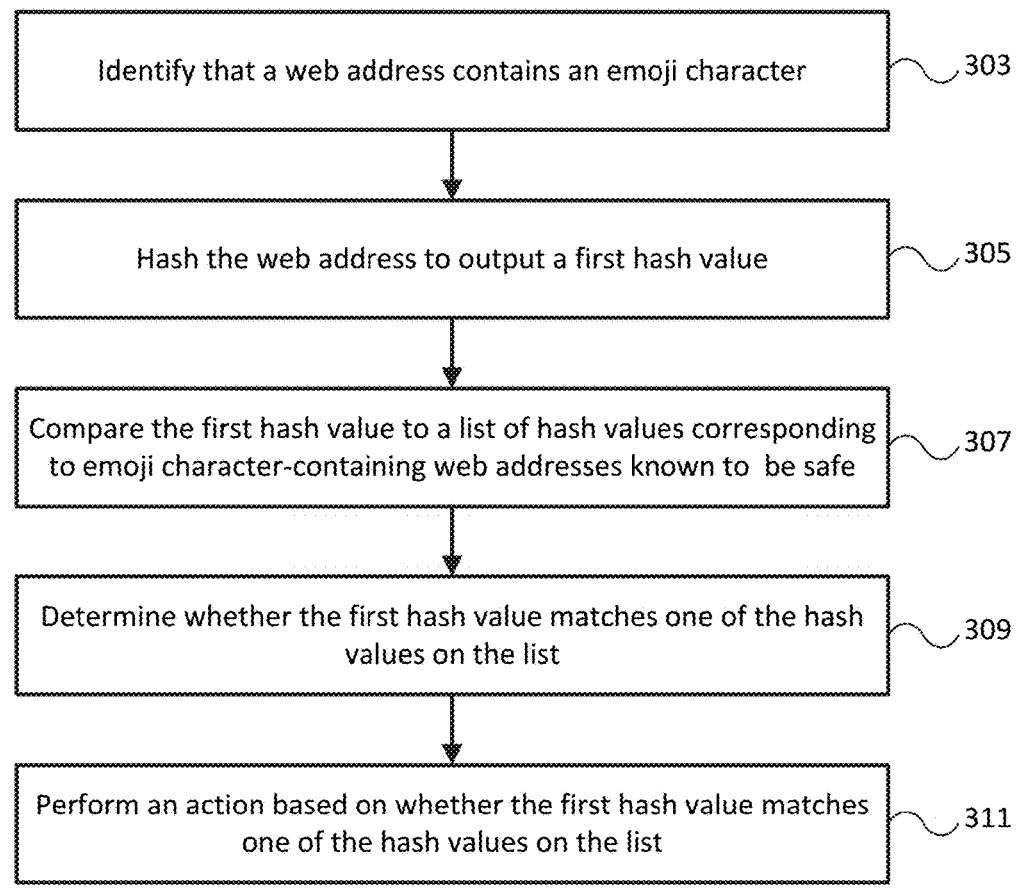
FIG. 3D illustrates a flow diagram of a process for preventing successes in phishing attempts that use emoji-containing domain web addresses in accordance with one or more embodiments of the present disclosure.

Referring to FIG. 3D, a flow diagram of a process 301 for detecting and preventing emoji-based phishing is illustrated in accordance with one or more embodiments of the present disclosure. The blocks of process 301 are described herein as occurring serially or linearly (e.g., one after another). However, multiple blocks of process 301 may occur in parallel. In addition, the blocks of process 301 need not be performed in the order shown and/or one or more of the blocks of process 301 need not be performed.

At block 303, a system may identify that that a web address located in a display interface of a user device contains an emoji character. For example, the system may parse the characters of the web address string to identify Unicode code points that correspond to emoji characters to identify any emoji characters present in the web address.

At block 305, the system may hash the web address using a hash function to output a first hash value. For example, the web address may be fed as an input to a hash function and a first hash value may be outputted from the hash function.

At block 307, the system may compare the first hash value to a list of hash values corresponding to emoji character-containing web addresses known to be safe. For example, the system may access a database that stores the emoji character-containing web addresses known to be safe to obtain the list of hash values. The list of hash values corresponding to emoji character-containing web addresses known to be safe may have been developed based on aggregated data from users of a service provider. The system may submit a query to the database requesting a response as to whether the first hash value matches any of the hash values on the list.

At block 309, the system may determine whether the first hash value matches one of the hash values on the list. For example, the system may receive a response from the database indicating whether the first hash value was found to match a hash value in the list stored at the database.

At block 311, the system may perform an action based on whether the first hash value matches one of the hash values on the list. If the first hash value does not match a hash value on the list, the system may warn a user that the web address does not match any known emoji-containing web addresses known by the system to be safe. For example, one or more of the indications to warn a user described in reference to FIG. 4 and FIGS. 3A-3C may be used to inform the user.

In some embodiments, in an action performed at block 311, the system may truncate the first hash value if it is greater than a threshold length and provide the truncated value as a visual cue for the user in a display interface of the user device with the idea being that the user would be able to recognize which websites are safe based on their corresponding hash values. For example, a safe emoji-containing web address may have a corresponding hash value of "4343," and the user would be able to quickly recognize when she/he is on the correct website based on the hash value indication (e.g., the hash value indication may be displayed adjacent to the web address in a web browser). Thus, when the user is presented with a false web address that contains an emoji and is intended to look like the safe web address, but is actually a phishing web address, the user can see that the hash value for the false web address is different than the familiar "4343" and may be a phishing web address.

In some embodiments, in another action performed at block 311, the system may display in the display interface, in an alternating fashion, the web address having the emoji character and the web address having the emoji character replaced by a code that represents the emoji character. Thus, a user would be able to quickly understand that an emoji-character is present in the web address. In other words, it may not be immediately apparent to the user that an emoji character is present in the web address, for example, the emoji character may blend with a background in a web browser or look like a common icon (e.g., safety lock, world wide web logo, etc.). When the emoji character is replaced by a code that represent the emoji character, in an alternating fashion (e.g., periodically such as every three second), it should be easily apparent to the user that there is an emoji character present in the web address. In some embodiments, the code that replaces the emoji character may include punycode.

In some embodiments, additional computer security actions may be taken when the emoji-containing web address does not match an emoji-containing web address on the list of emoji-containing web addresses known to be safe. For example, the system may determine that the web address is being accessed by the user for the first time (e.g., by analyzing a web browsing history). The system may further determine that the web page corresponding to the web address is requesting information through a user input to the user device associated with the user. Based on the web address being accessed by the user device for the first time and the web page requesting the information by the user input from the user, the system may display, in the display interface of the user device, a confirmation dialogue window that prompts the user to confirm that the user desires to proceed with the web page and understands the risks associated with the web page.

Figure 4A:
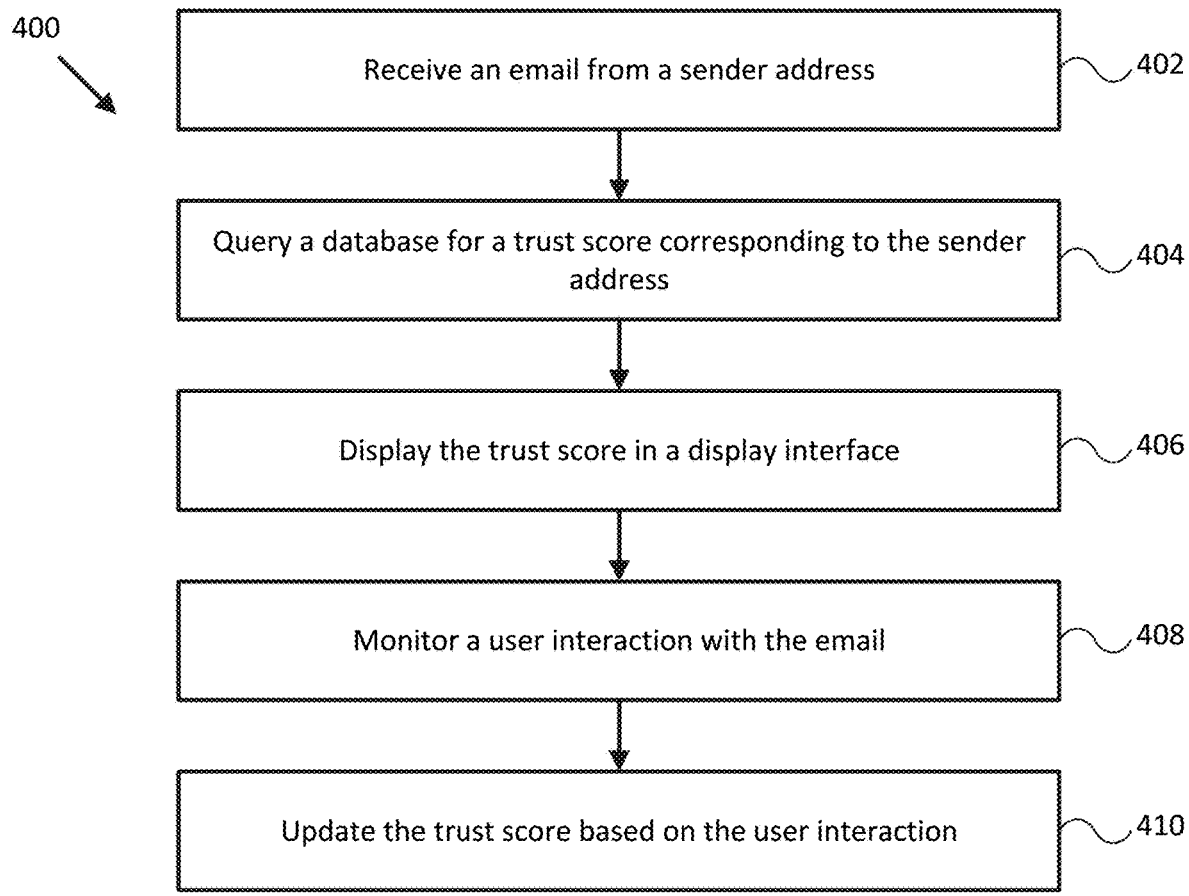
FIG. 4A illustrates a flow diagram of a process for preventing successes in email phishing attempts that use emoji-containing domain web addresses in accordance with one or more embodiments of the present disclosure.

Referring now to FIG. 4A, a flow diagram of a process 400 for detecting and preventing phishing is illustrated in accordance with one or more embodiments of the present disclosure. The blocks of process 400 are described herein as occurring in serial, or linearly (e.g., one after another). However, multiple blocks of process 400 may occur in parallel. In addition, the blocks of process 400 need not be performed in the order shown and/or one or more of the blocks of process 400 need not be performed.

A client application (e.g., an email client), and/or an add-in application for the client application, may be stored in a non-transitory memory as instructions readable by one or more hardware processors of a computing device. The non-transitory memory and one or more hardware processors (e.g., the computing device) may be integrated into a system such that the instructions stored on the non-transitory memory may be read by the one or more hardware processors to cause the system to perform one or more operations of process 400 discussed below.

At block 402, the system receives an incoming email from a sender address. In some embodiments, the system may receive the incoming email by requesting, for download, the email stored in a user's mailbox on a remote server. In some cases, the request for download may be preconfigured in the client application running on the system such that emails are automatically downloaded, such as at predetermined intervals, or manually initiated by the user.

At block 404, the system queries a database for a trust score corresponding to the sender address. A trust score may be a score calculated based on previous user interactions with the sender email address. In various embodiments, the trust score may be calculated based on a weighted average of the different user interactions. For example, if the user has received, opened, read, forwarded, and/or replied to a number of emails from a certain sender email address before (without blocking, reporting, flagging the sender email address), subsequent emails from the sender email address may have a positive weight effect on the trust score. Further, if the user has frequently opened embedded links in emails from the sender email address or downloaded attachments from the sender email address, such actions may have a positive weight effect on the trust score. Blocking the sender email address, reporting the sender email address as spam or junk mail, unsubscribing from, and/or flagging the sender email address as a malicious email address may have a negative weight effect on the trust score. In some embodiments, a trust score for a sender email address may initially be zero or a lowest trust score until the user interacts with the sender email address enough to establish a trust score and increase the trust score.

Figure 4B:
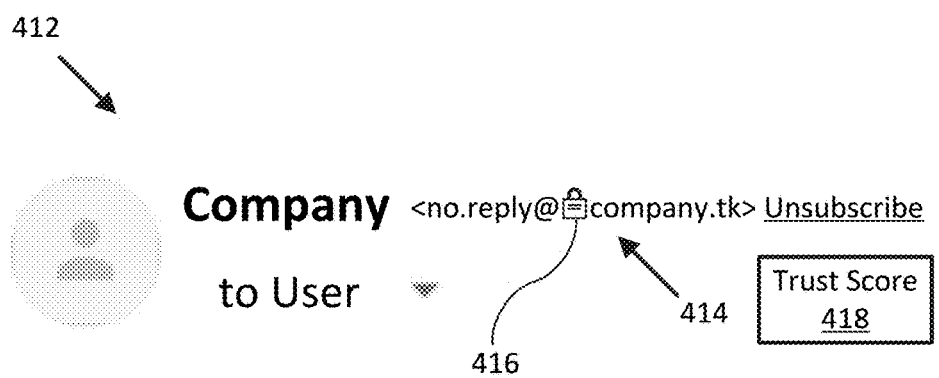
FIG. 4B illustrates an example for preventing successful email phishing attempts in accordance with one or more embodiments of the present disclosure.

Thus, referring to FIG. 4B, in cases where the user receives an email 412 from a sender email address 414 that contains an emoji 416 and the sender is attempting to deceive the user into believe they are receiving an email from a legitimate source such as Company ("company.tk" without emoji 416), the sender email address 414 may have a low trust score.

Referring back to FIG. 4A, at block 406, the system may display the trust score in a user interface of the client application in proximity to the sender email address. For example, as shown in FIG. 4B, trust score 418 may be displayed in an email header of the email 412 from the sender email address 414. The trust score 418 may be displayed in other locations of the email client and may be displayed in various manners. For example, the trust score 418 may be displayed as a pop-up alert box when the user attempts to select the email 412 for reading.

At block 408, the system may monitor a user interaction with the email. The system may detect whether the user opens the email, reads the email (e.g., monitoring how long the user maintains the opened email and if the user scrolls the entirety of the email), forwards the email, replies to the email, archives the email, opens/selects embedded link(s) in the email, downloads attachment(s) in the email, or any other positively associated action that may increase the trust score for the sender email address. The system may also detect whether the user blocks the sender email address, reports the sender email address as spam or junk mail, unsubscribes from emails from the sender email address, flags the sender email address as a malicious email address, or any other negatively associate action that may largely decrease the trust score for the sender email address.

At block 410, the system updates the trust score based on the user interaction. While examples are provided above for various positively and negatively associated user interactions, it will be appreciated that the user interactions may be positively or negatively correlated, and the weights given to the user interactions used to calculate the trust score may be adjusted to suit a desired application.

Figure 5:
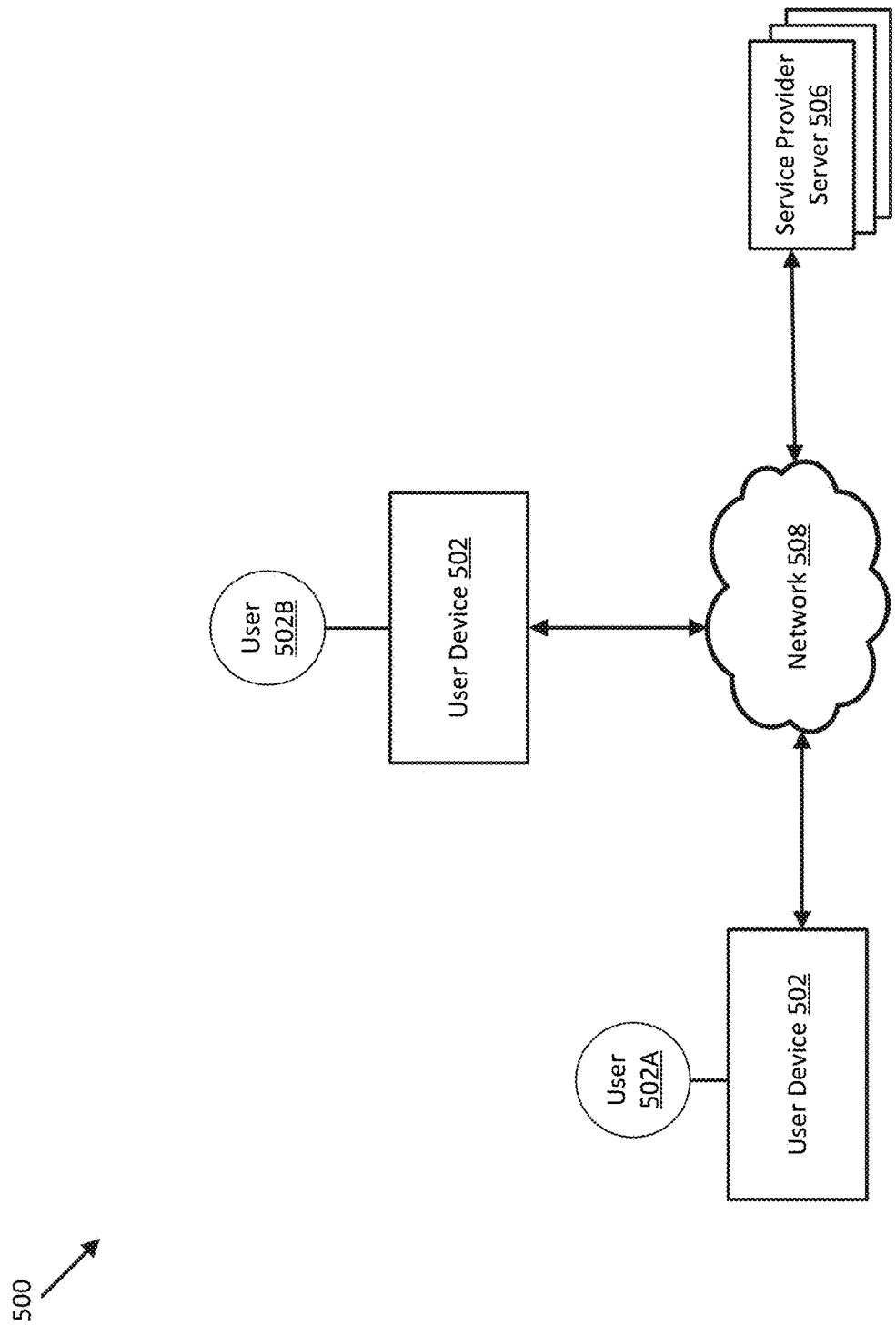
FIG. 5 illustrates a block diagram of a networked computer system suitable for implementing one or more embodiments of the present disclosure.

FIG. 5 illustrates a block diagram of a networked system 500 configured smart cloud caching using edge compute and real-time customer journey insights in accordance with one or more embodiments of the present disclosure. System 500 includes user devices 502 and service provider server(s) 506. A user 502A is associated with user device 502, where user 502A can provide an input to service provider server 506 using user device 502.

User device 502 and service provider server 506 may each include one or more processors, memories, and other appropriate components for executing computer-readable instructions such as program code and/or data stored on one or more computer-readable mediums to implement the various applications, data, and steps described herein. For example, such instructions may be stored in one or more computer-readable media such as memories or data storage devices internal and/or external to various components of system 500, and/or accessible over a network 508. Each of the memories may be non-transitory memory. Network 508 may be implemented as a single network or a combination of multiple networks. For example, in various embodiments, network 508 may include the Internet or one or more intranets, landline networks, and/or other appropriate types of networks.

User device 502 may be implemented using any appropriate hardware and software configured for wired and/or wireless communication over network 508. For example, in some embodiments, user device 502 may be implemented as a personal computer (PC), a mobile phone, personal digital assistant (PDA), laptop computer, and/or other types of computing devices capable of transmitting and/or receiving data, such as an iPhone™, Apple Watch™, or iPad™ from Apple™.

User device 502 may include one or more browser applications which may enable the user device 502 to various web applications provided by service provider server(s) 506 over network 508. User device 502 may also include one or more toolbar applications which may be used, for example, to provide client-side processing for performing desired tasks in response to operations selected by user 502A. In one embodiment, the toolbar application may display a user interface in connection with the browser application.

User device 502 may further include other applications as may be desired in particular embodiments to provide desired features to user device 502. For example, the other applications may include an application to interface between service provider server 506 and the network 508, security applications for implementing client-side security features, programming client applications for interfacing with appropriate application programming interfaces (APIs) over network 508, or other types of applications. In some cases, the APIs may correspond to service provider server 506. The applications may also include email, texting, voice, and instant messaging applications that allow user 502A to send and receive emails, calls, and texts through network 508, as well as applications that enable the user to communicate to service provider server 506 as discussed above. User device 502 includes one or more device identifiers which may be implemented, for example, as operating system registry entries, cookies associated with the browser application, identifiers associated with hardware of user device 502, or other appropriate identifiers, such as those used for user, payment, device location, and or authentication. In some embodiments, a device identifier may be used by service provider server 506 to associate user 502A with a particular account maintained by the service provider server 506. A communications application with associated interfaces facilitates communication between user device 502 and other components within system 500. User device 204 associated with user 502B may be similar to user device 502.

Service provider server 506 may be maintained, for example, by an online cloud service provider. In this regard, service provider server 506 includes one or more applications which may be configured to interact with user device 502 and user device 204 over network 508 to facilitate the provision of client application functionality as discussed in the present disclosure. Service provider server 506 maintains a plurality of user accounts (e.g., stored in a user account database accessible by service provider server 506), each of which may include individual user data and preferences.

Figure 6:
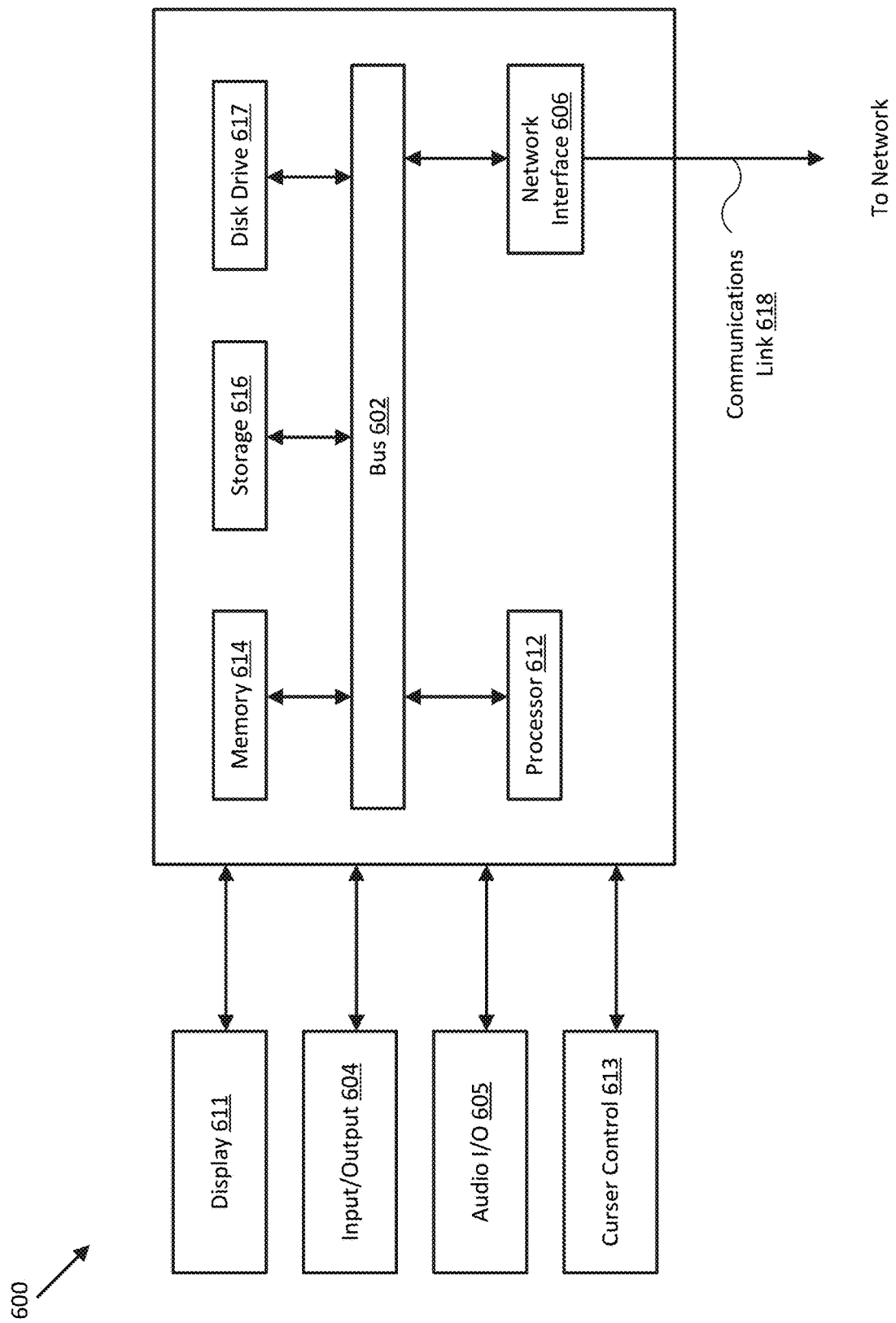
FIG. 6 illustrates a block diagram of a computer system in accordance with one or more embodiments of the present disclosure.

FIG. 6 illustrates a block diagram of a computer system 600 suitable for implementing one or more embodiments of the present disclosure. In various implementations, the computer system 600 may comprise a personal computing device (e.g., a personal computer, laptop, smart phone, PDA, Bluetooth device, key FOB, badge, wearable device such as a smart watch, smart TV, or any other visual accessibility capable device) and/or a server computing device. It should be appreciated that each of the devices utilized by users and service providers discussed herein may be implemented as computer system 600 in a manner as follows.

Computer system 600 includes a bus 602 or other communication mechanism for communicating information data, signals, and information between various components of computer system 600. Components include an input/ output (I/O) component 604 that processes a user action, such as selecting keys from a keypad/keyboard, selecting one or more buttons or links, etc., and sends a corresponding signal to bus 602. I/O component 604 may also include an output component, such as a display 611 and a cursor control 613 (such as a keyboard, keypad, mouse, etc.). I/O component 604 may further include NFC communication capabilities. An optional audio I/O component 605 may also be included to allow a user to use voice for inputting information by converting audio signals. Audio I/O component 605 may allow the user to hear audio such as audible descriptions provided by a screen reader application. A transceiver or network interface 606 transmits and receives signals between computer system 600 and other devices, such as another user device, an entity server, and/or a provider server via network 508. In one embodiment, the transmission is wireless, although other transmission mediums and methods may also be suitable. Processor 612, which may be one or more hardware processors, can be a micro-controller, digital signal processor (DSP), or other processing component, processes these various signals, such as for display on computer system 600 or transmission to other devices via a communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer-readable medium, which may refer to any medium that participates in providing instructions to processor 612 for execution. Such a medium may take many forms, including but not limited to, non-volatile media, volatile media, and transmission media. In various implementations, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media include, for example, solid-state drive, floppy disk, flexible disk, hard disk, magnetic tape, any other magnetic medium, CD-ROM, any other optical medium, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network 508 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A computer system comprising:
   one or more hardware processors; and
   a non-transitory memory having instructions stored thereon that are executable by the one or more hardware processors to cause the computer system to perform operations comprising:
      receiving a web address as an input to a web browser;
      detecting that the web address includes an emoji character;
      preventing outgoing communications with a site corresponding to the web address by the web browser based on the web address including the emoji character;
      processing the received web address to remove any emoji characters present in the received web address;
      hashing the received web address using a hash function to provide a first hash value;
      comparing the received web address to the processed web address and the first hash value to known hash values of safe web addresses;
      based on the comparing, determining whether the processed web address matches the received web address;
      indicating, in the web browser, whether the processed web address matches the received web address; and
      determining whether to allow the outgoing communications with the site corresponding to the web address based on a response to the indicating.

2. The computer system of claim 1, wherein the processing the received web address further comprises:
   generating a screen image of the received web address; and
   converting the screen image of the received web address to a character string comprising alphanumeric characters recognized from the received web address, wherein the converting the screen image of the received web address to the character string omits any emojis present in the received web address,
wherein the comparing comprises comparing the received web address to the character string.

3. The computer system of claim 2, wherein the converting the screen image of the received web address to the character string is performed using Optical Character Recognition.

4. The computer system of claim 1, wherein the processing the received web address comprises parsing a plurality of characters in the received web address to generate the processed web address that omits any emoji characters present in the received web address.

5. The computer system of claim 1, wherein the operations further comprise:
hashing the processed web address using the hash function to provide a second hash value, wherein the comparing the received web address to the processed web address comprises comparing the first hash value to the second hash value.

6. The computer system of claim 1, wherein the operations further comprise:
loading, in the web browser, a web page corresponding to the received web address, the web page having one or more images;
generating an image-domain signature based on the received web address and the one or more images loaded on the web page; and
determining whether the image-domain signature matches a stored safe image-domain signature.

7. The computer system of claim 1, wherein the operations further comprise:
determining that the received web address is being accessed in the web browser for a first time over a web browser history;
determining that there is a mismatch between the received web address and the processed web address; and
in response to the determining that the received web address is being accessed by the web browser for the first time and the determining the mismatch between the received web address and the processed web address, displaying an alert in the web browser for a user of the web browser.

8. The computer system of claim 1, wherein the operations further comprise:
in response to determining that the received web address does not match the processed web address, displaying the received web address in a text color in an address bar of the web browser, wherein the text color corresponds to an indication of the mismatch, and wherein a different text color corresponds to an indication of a match.

9. A method comprising:
identifying, by a computing device, that a web address located in a display interface of the computing device contains an emoji character;
preventing outgoing communications with a site corresponding to the web address by the computing device based on the web address including the emoji character;
hashing, by the computing device, the web address using a hash function to output a first hash value;
comparing, by the computing device, the first hash value to a list of hash values corresponding to emoji character-containing web addresses known to be safe;
determining, by the computing device, whether the first hash value matches one of the hash values on the list;
based on the determining, providing, by the computing device, an indication in the display interface as to whether the web address is safe; and
determining whether to allow the outgoing communications with the site corresponding to the web address based on a response to the indication.

10. The method of claim 9, wherein:
the first hash value is determined to not match one of the hash values on the list; and
the indication indicates to a user of the computing device that the web address does not correspond to any of the web addresses known to be safe.

11. The method of claim 9, wherein the indication includes a display of a colorized display interface element, the colorized display interface element having one of a plurality of colors corresponding to an indication of whether the first hash value matches one of the hash values on the list.

12. The method of claim 9, further comprising:
truncating, by the computing device, the first hash value, wherein the indication includes the truncated first hash value as a visual cue for a user.

13. The method of claim 9, further comprising:
displaying, by the computing device, in the display interface, in an alternating fashion, the web address having the emoji character and the web address having the emoji character replaced by a code that represents the emoji character.

14. The method of claim 13, wherein the code that replaces the emoji character comprises punycode.

15. The method of claim 9, further comprising:
determining, by the computing device, that the web address is being accessed by the computing device for a first time;
determining, by the computing device, that a web page corresponding to the web address is requesting information through a user input to the computing device; and
based on the web address being accessed by the computing device for the first time and the web page requesting the information by the user input from the user, providing, by the computing device, a confirmation dialogue window in the display interface, wherein the confirmation dialogue window prompts the user to confirm that the user wants to proceed with the web page.

16. A non-transitory machine-readable medium having instructions stored thereon, wherein the instructions are executable to cause a machine to perform operations comprising:
receiving a web address as an input to a web browser;
detecting that the web address includes an emoji character;
preventing outgoing communications with a web page corresponding to the web address by the web browser based on the web address including the emoji character;
processing the received web address to remove any emoji characters present in the received web address;
hashing the received web address using a hash function to provide a first hash value;
comparing the received web address to the processed web address and the first hash value to known hash values of safe web addresses;
based on the comparing, determining whether the processed web address matches the received web address;
indicating, in the web browser, whether the processed web address matches the received web address; and determining whether to allow the outgoing communications with the webpage corresponding to the web address based on a response to the indicating.

17. The non-transitory machine-readable medium of claim 16, wherein the operations further comprise:
generating a screen image of the received web address; and
converting the screen image of the received web address to a character string comprising alphanumeric characters recognized from the web address, wherein the converting the screen image of the web address to the character string omits any emojis present in the web address, wherein the comparing comprises comparing the received web address to the character string.

18. The non-transitory machine-readable medium of claim 17, further comprising:
hashing the character string using the hash function to provide a second hash value, wherein the comparing the received web address to the processed web address comprises comparing the first hash value to the second hash value.

19. The non-transitory machine-readable medium of claim 16, wherein the operations further comprise:
loading a web page in the web browser for the received web address, the web page having one or more images;
generating an image-domain signature based on the received web address and the one or more images loaded on the web page; and
determining whether the image-domain signature matches a stored safe image-domain signature.

20. The non-transitory machine-readable medium of claim 16, wherein the operations further comprise:
determining that the processed web address does not match the received web address; and
displaying in a display interface, in an alternating fashion, the received web address having an emoji character and the received web address having the emoji character replaced by a text code that represents the emoji character.

* * * * *

UNITED STATES PATENT AND TRADEMARK OFFICE
CERTIFICATE OF CORRECTION

| | | |
|---|---|---|
| PATENT NO. | : 12,058,172 B2 | Page 1 of 2 |
| APPLICATION NO. | : 17/347449 | |
| DATED | : August 6, 2024 | |
| INVENTOR(S) | : George Chen Kaidi | |

It is certified that error appears in the above-identified patent and that said Letters Patent is hereby corrected as shown below:

On the Title Page

In the item (57) Abstract:

Lines 2-3, change:
"web address phishing are disclosed. A system may provide computer system security in various instances in which a"
To:
--web address phishing are disclosed. The present techniques thus improve computer system security in various instances in which a--.

Line 7, change:
"security breach. The system receives a web address as an"
To:
--security breach. In an embodiment, a system receives a web address as an--.

In the Specification

In the Description:

Column 2, Line 33, change:
"front of the company "company.tk" domain of the web address 102a"
To:
--front of the "company.tk" domain of the web address 102--.

Column 2, Line 50, change:
"would not be part of the web address of the current website/"
To:
--would not be part of the web address of the current website.--.

Signed and Sealed this
Twenty-second Day of October, 2024

Katherine Kelly Vidal
*Director of the United States Patent and Trademark Office*

CERTIFICATE OF CORRECTION (continued)
U.S. Pat. No. 12,058,172 B2

Column 3, Lines 10-11 and 17, change:
"For example, FIG. 1B shows a decptive emoji 104b in a web address 102b where the emoji 104b looks like a world"
To:
--For example, FIG. 1B shows a deceptive emoji 102b in a web address 102b where the emoji 102b looks like a world--.

Column 3, Line 17, change:
"address 102d "COMPANY.FM," which may go unnoticed to"
To:
--address 102D "COMPANY.FM," which may go unnoticed to--.